United States Patent
Kwan et al.

(10) Patent No.: US 9,842,264 B2
(45) Date of Patent: Dec. 12, 2017

(54) METHOD AND SYSTEM FOR UGV GUIDANCE AND TARGETING

(71) Applicants: Chiman Kwan, Rockville, MD (US); Bulent Ayhan, Bethesda, MD (US)

(72) Inventors: Chiman Kwan, Rockville, MD (US); Bulent Ayhan, Bethesda, MD (US)

(*) Notice: Subject to any disclaimer, the term of this patent is extended or adjusted under 35 U.S.C. 154(b) by 10 days.

(21) Appl. No.: 15/226,406

(22) Filed: Aug. 2, 2016

(65) Prior Publication Data
US 2017/0046579 A1 Feb. 16, 2017

Related U.S. Application Data

(60) Provisional application No. 62/204,028, filed on Aug. 12, 2015.

(51) Int. Cl.
| | |
|---|---|
| *G06K 9/00* | (2006.01) |
| *G06T 3/00* | (2006.01) |
| *G06K 9/62* | (2006.01) |
| *G06T 7/33* | (2017.01) |
| *G06T 7/35* | (2017.01) |

(Continued)

(52) U.S. Cl.
CPC ....... *G06K 9/00791* (2013.01); *G06K 9/2018* (2013.01); *G06K 9/4671* (2013.01); *G06K 9/6211* (2013.01); *G06K 9/6269* (2013.01); *G06T 3/0068* (2013.01); *G06T 7/33* (2017.01);

(Continued)

(58) Field of Classification Search
None
See application file for complete search history.

(56) References Cited

U.S. PATENT DOCUMENTS

| | | | |
|---|---|---|---|
| 7,424,218 B2* | 9/2008 | Baudisch | G03B 13/02 348/218.1 |
| 7,747,364 B2* | 6/2010 | Roy | G05D 1/0044 244/158.1 |

(Continued)

OTHER PUBLICATIONS

Li et al., "Invariant observer-based state estimation for micro-aerial vehicles in GPS-denied indoor environments", Micromachines 2015, 6(4), 487-522 (published Apr. 22, 2015).*

(Continued)

*Primary Examiner* — Soo Park
(74) *Attorney, Agent, or Firm* — WPAT, PC

(57) ABSTRACT

This invention fuses spectral information from multiple imagers of an unmanned ground vehicle (UGV). Since the imagers contain different spectral information for each pixel location, the invention provides highly accurate targeting and guidance information to the UGV. The invention applies a robust 2-step image registration process for alignment of images captured by each of the multiple imagers to automatically identify targets of interest, so that the UGV can move toward the targets. This two-step image registration process can achieve sub-pixel accuracy. After registration, a new multispectral image is formed with pixels containing spectral information from all imagers. The invention further incorporates an accurate anomaly detection algorithm to help detect new targets in the scene, and incorporates advanced composition estimation algorithms to determine the composition of targets. Finally, the invention allows users to interact with the target detection results through a user friendly graphical user interface.

11 Claims, 13 Drawing Sheets

(51) Int. Cl.
*G06K 9/20* (2006.01)
*G06K 9/46* (2006.01)
(52) U.S. Cl.
CPC ...... *G06T 7/35* (2017.01); *G06T 2207/10021* (2013.01); *G06T 2207/20076* (2013.01)

(56) References Cited

U.S. PATENT DOCUMENTS

| | | | | |
|---|---|---|---|---|
| 8,723,953 | B2* | 5/2014 | Klomp | H04N 7/18 348/144 |
| 2007/0025723 | A1* | 2/2007 | Baudisch | G03B 13/02 396/287 |
| 2008/0215204 | A1* | 9/2008 | Roy | G05D 1/0044 701/28 |
| 2011/0090337 | A1* | 4/2011 | Klomp | G01C 11/025 348/144 |
| 2013/0016180 | A1* | 1/2013 | Ono | H04N 5/145 348/36 |
| 2015/0063691 | A1* | 3/2015 | Jolly | G06K 9/4652 382/165 |

OTHER PUBLICATIONS

Mnih, "Machine learning for aerial image labeling", thesis 2013.*
Plinval et al., "Control and estimation algorithms for the stabilization of VTOL UAVs from mono-camera measurements", AerospaceLab, 2014, 8, 1-10.*
Vakalopoulou et al., "Automatic descriptor-based co-registration of frame hyperspectral data", Remote Sens., 2014, 6, 3409-3426.*
Yushi Chen, Zhouhan Lin, Xing Zhao, Gang Wang and Yanfeng Gu, "Deep Learning-Based Classification of Hyperspectral Data", Jun. 2014, p. 2094-2107, vol. 7, No. 6, IEEE Journal of Selected Topics in Applied Earth Observations and Remote Sensing.
Yoshua Bengio, Aaron Courville, and Pascal Vincent, "Representation Learning: A Review and New Perspectives", August 2013, p. 1798-1828, vol. 35, No. 8, IEEE Transactions on Pattern Analysis and Machine Intelligence.

* cited by examiner

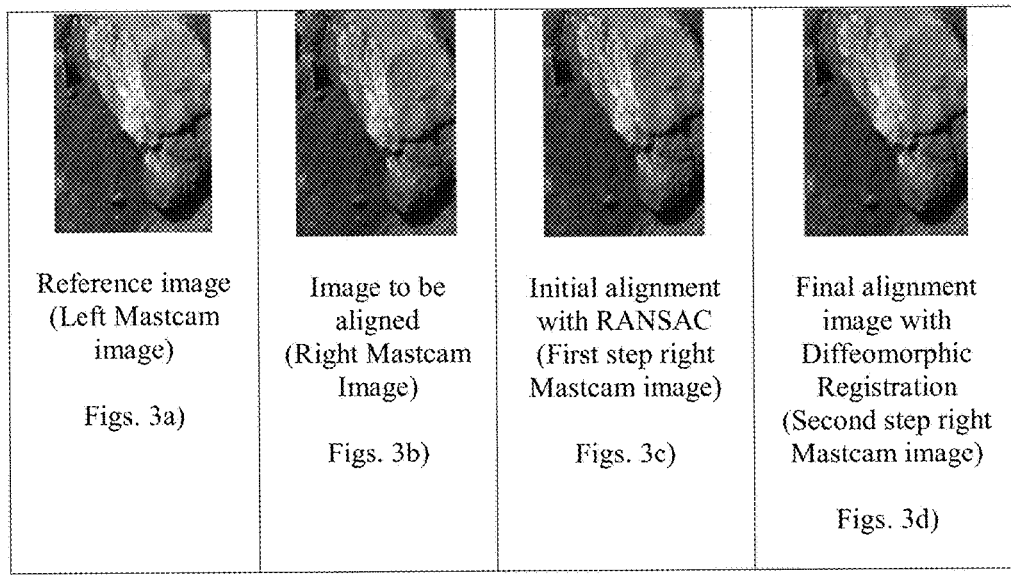

Error difference between reference image and initial alignment image with RANSAC (both images are normalized with respect to maximum pixel value).

Error difference between reference image and final alignment image with Diffeomorphic registration (both images are normalized with respect to maximum pixel value)

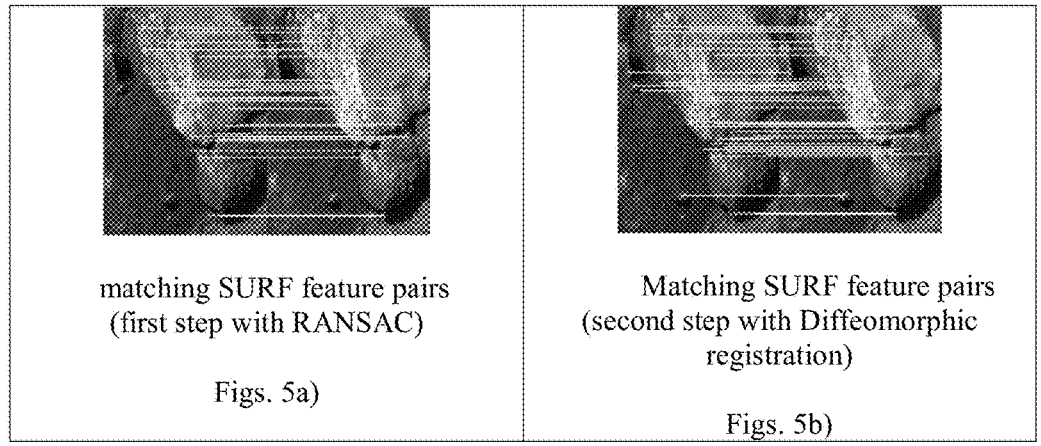
matching SURF feature pairs
(first step with RANSAC)
Figs. 5a)
Matching SURF feature pairs
(second step with Diffeomorphic
registration)
Figs. 5b)
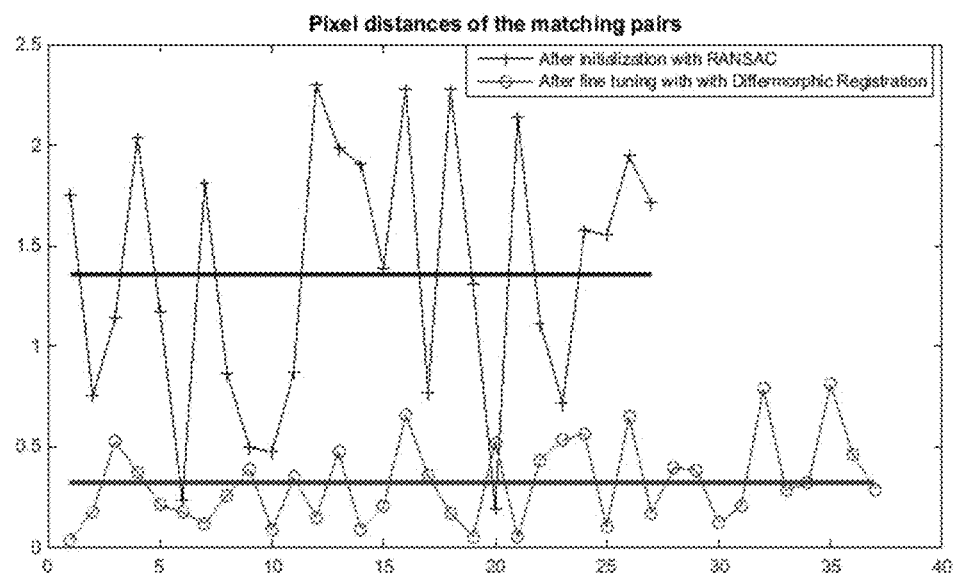
Pixel distances in the matched features in each step of the two-step registration
approach
Figs. 5c)

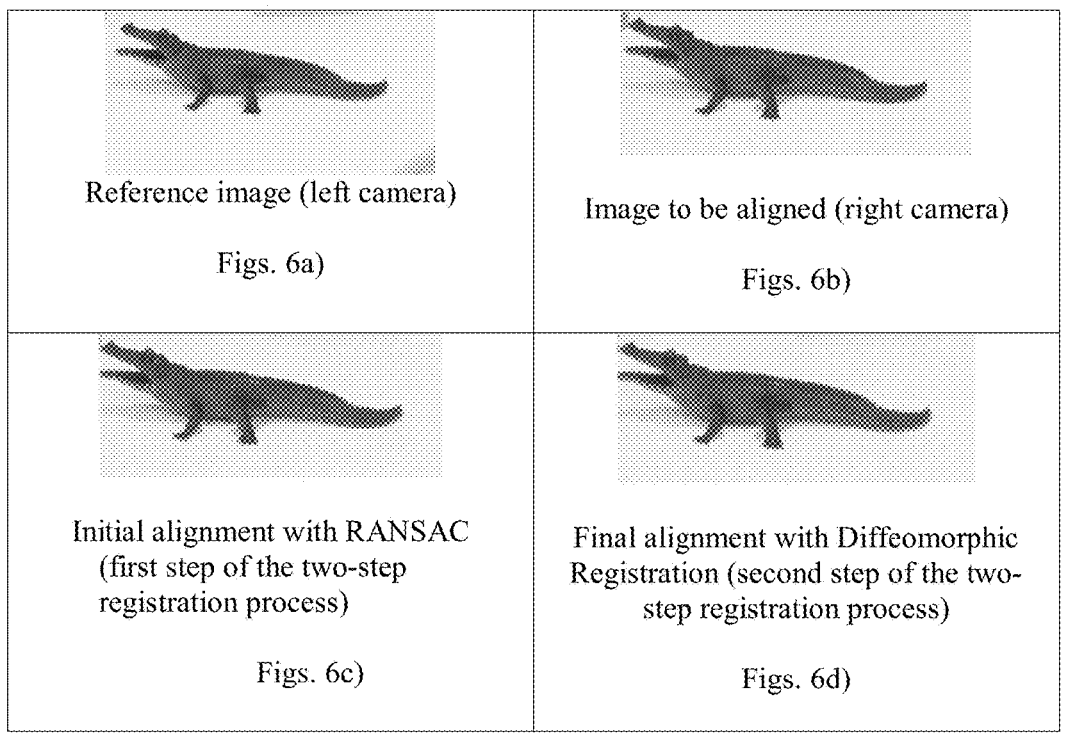

KRX using all data points

Using 50 points

Using 50 clusters

ROC of CKRX and KRX

Number 2 shows CKRX

METHOD AND SYSTEM FOR UGV GUIDANCE AND TARGETING

BACKGROUND OF THE INVENTION

At present, devices and methods for waypoint target generation and mission spooling for mobile ground robots or Unmanned Ground Vehicle (UGV) require an operator to manually enter waypoints. In order to implement automated waypoint generation, methods of image registration, parallax compensation and change detection would be required. However, it is well known that image registration may not be perfect. In addition, parallax is an important practical issue during data collection. Hence, a robust change detection algorithm such as CKRX is needed.

Support Vector Machines (SVM) and non-deep neural networks (NN) have been used in many pattern classification applications. However, it is believed that there is a lot of room for further improvement. This is because SVM and non-deep NN have only one or two layers of tunable parameters. Since pattern recognition and concentration estimation are complex and involve sophisticated features, SVM and non-deep NN may be restricted in achieving high classification rate.

BRIEF SUMMARY OF THE INVENTION

The present invention utilizes left and right multispectral imagers to apply a novel robust 2-step image registration process for image alignment that improves downstream identification of interesting targets automatically, so that the UGV can move toward the targets.

One embodiment of the present invention is to provide a method and system, which utilizes multiple multi-spectral imagers for UGV guidance and target acquisition. Since the different imagers of a UGV may contain different spectral information for each pixel location, this invention provides several novel and high performance sub-systems to fuse spectral information from the multiple imagers to provide highly accurate targeting and guidance information to the UGV. The invention presents a method for use with a UGV utilizing multiple multispectral imagers and an onboard PC.

An embodiment of the present invention incorporates a novel two-step image registration process that can achieve sub-pixel accuracy. After registration, a new multispectral image is formed with each pixel containing spectral information from all imagers.

Another embodiment of the present invention incorporates an accurate anomaly detection process to help detect new targets in the scene.

Another embodiment of the present invention is to incorporate Advanced Composition Estimation algorithms to determine the composition of targets.

Another embodiment of the present invention is to allow users to interact with the target detection results through a user friendly graphical user interface.

BRIEF DESCRIPTION OF THE SEVERAL VIEWS OF THE DRAWINGS

FIGS. 3*a*)-3*d*) show alignment results with the two-step registration approach.

FIGS. 5*a*)-5*c*) show the alignment accuracy with a pixel-distance based measure in the two-step registration process.

FIGS. 6*a*)-6*d*) show alignment results with the two-step registration process using a partial image section from one of the Middlebury stereo pair images.

DETAILED DESCRIPTION OF THE INVENTION

Figure 1:
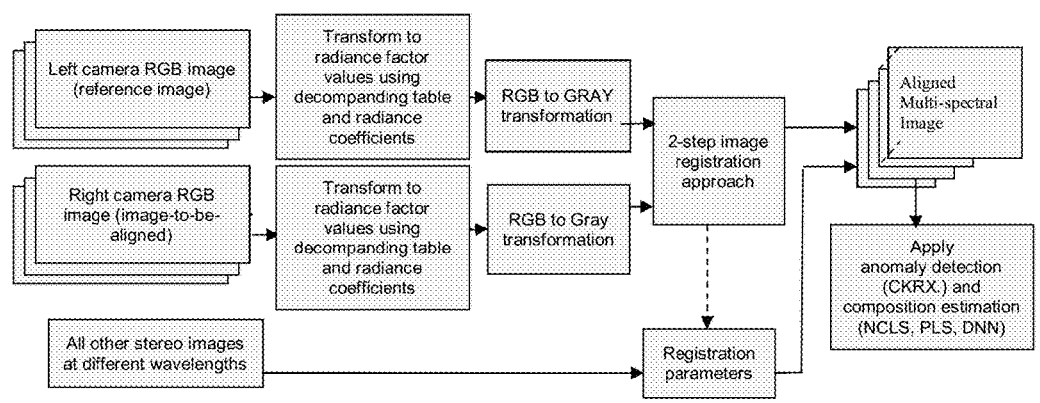
FIG. 1 shows a block diagram of multispectral imagers using anomaly detection and composition estimation to select interesting locations for automatic UGV guidance and targeting.

FIG. 1 shows the block diagram of the present invention. There is a preprocessing step to first convert the 8-bit numbers in the image data to decompanded numbers of a range with greater than 8 bits. The conversion is optionally done through a look-up table as in the example shown below.

TABLE 1

Example decompanding table between 8-bit and 11-bit numbers.

| 8-bit | 12-bit |
|---|---|
| 0 | 0 |
| 1 | 2 |
| 2 | 3 |
| 3 | 3 |
| 4 | 4 |
| 5 | 5 |
| 6 | 5 |
| 7 | 6 |
| 8 | 7 |
| 9 | 8 |
| 10 | 9 |
| 11 | 10 |
| 12 | 11 |
| 13 | 12 |
| 14 | 14 |
| 15 | 15 |
| 16 | 16 |
| 17 | 18 |
| 18 | 19 |
| 19 | 20 |
| 20 | 22 |
| 21 | 24 |
| 22 | 25 |
| 23 | 27 |
| 24 | 29 |
| 25 | 31 |
| 26 | 33 |
| 27 | 35 |
| 28 | 37 |
| 29 | 39 |
| 30 | 41 |
| 31 | 43 |
| 32 | 46 |
| 33 | 48 |
| 34 | 50 |
| 35 | 53 |
| 36 | 55 |
| 37 | 58 |

TABLE 1-continued

Example decompanding table between 8-bit and 11-bit numbers.

| 8-bit | 12-bit |
|---|---|
| 38 | 61 |
| 39 | 63 |
| 40 | 66 |
| 41 | 69 |
| 42 | 72 |
| 43 | 75 |
| 44 | 78 |
| 45 | 81 |
| 46 | 84 |
| 47 | 87 |
| 48 | 90 |
| 49 | 94 |
| 50 | 97 |
| 51 | 100 |
| 52 | 104 |
| 53 | 107 |
| 54 | 111 |
| 55 | 115 |
| 56 | 118 |
| 57 | 122 |
| 58 | 126 |
| 59 | 130 |
| 60 | 134 |
| 61 | 138 |
| 62 | 142 |
| 63 | 146 |
| 64 | 150 |
| 65 | 154 |
| 66 | 159 |
| 67 | 163 |
| 68 | 168 |
| 69 | 172 |
| 70 | 177 |
| 71 | 181 |
| 72 | 186 |
| 73 | 191 |
| 74 | 196 |
| 75 | 201 |
| 76 | 206 |
| 77 | 211 |
| 78 | 216 |
| 79 | 221 |
| 80 | 226 |
| 81 | 231 |
| 82 | 236 |
| 83 | 241 |
| 84 | 247 |
| 85 | 252 |
| 86 | 258 |
| 87 | 263 |
| 88 | 269 |
| 89 | 274 |
| 90 | 280 |
| 91 | 286 |
| 92 | 292 |
| 93 | 298 |
| 94 | 304 |
| 95 | 310 |
| 96 | 316 |
| 97 | 322 |
| 98 | 328 |
| 99 | 334 |
| 100 | 341 |
| 101 | 347 |
| 102 | 354 |
| 103 | 360 |
| 104 | 367 |
| 105 | 373 |
| 106 | 380 |
| 107 | 387 |
| 108 | 394 |
| 109 | 401 |
| 110 | 408 |
| 111 | 415 |
| 112 | 422 |
| 113 | 429 |

TABLE 1-continued

Example decompanding table between 8-bit and 11-bit numbers.

| 8-bit | 12-bit |
|---|---|
| 114 | 436 |
| 115 | 443 |
| 116 | 450 |
| 117 | 458 |
| 118 | 465 |
| 119 | 472 |
| 120 | 480 |
| 121 | 487 |
| 122 | 495 |
| 123 | 503 |
| 124 | 510 |
| 125 | 518 |
| 126 | 526 |
| 127 | 534 |
| 128 | 542 |
| 129 | 550 |
| 130 | 558 |
| 131 | 566 |
| 132 | 575 |
| 133 | 583 |
| 134 | 591 |
| 135 | 600 |
| 136 | 608 |
| 137 | 617 |
| 138 | 626 |
| 139 | 634 |
| 140 | 643 |
| 141 | 652 |
| 142 | 661 |
| 143 | 670 |
| 144 | 679 |
| 145 | 688 |
| 146 | 697 |
| 147 | 706 |
| 148 | 715 |
| 149 | 724 |
| 150 | 733 |
| 151 | 743 |
| 152 | 752 |
| 153 | 761 |
| 154 | 771 |
| 155 | 781 |
| 156 | 790 |
| 157 | 800 |
| 158 | 810 |
| 159 | 819 |
| 160 | 829 |
| 161 | 839 |
| 162 | 849 |
| 163 | 859 |
| 164 | 869 |
| 165 | 880 |
| 166 | 890 |
| 167 | 900 |
| 168 | 911 |
| 169 | 921 |
| 170 | 932 |
| 171 | 942 |
| 172 | 953 |
| 173 | 964 |
| 174 | 974 |
| 175 | 985 |
| 176 | 996 |
| 177 | 1007 |
| 178 | 1018 |
| 179 | 1029 |
| 180 | 1040 |
| 181 | 1051 |
| 182 | 1062 |
| 183 | 1074 |
| 184 | 1085 |
| 185 | 1096 |
| 186 | 1108 |
| 187 | 1119 |
| 188 | 1131 |
| 189 | 1142 |

TABLE 1-continued

Example decompanding table between 8-bit and 11-bit numbers.

| 8-bit | 12-bit |
|---|---|
| 190 | 1154 |
| 191 | 1166 |
| 192 | 1177 |
| 193 | 1189 |
| 194 | 1201 |
| 195 | 1213 |
| 196 | 1225 |
| 197 | 1237 |
| 198 | 1249 |
| 199 | 1262 |
| 200 | 1274 |
| 201 | 1286 |
| 202 | 1299 |
| 203 | 1311 |
| 204 | 1324 |
| 205 | 1336 |
| 206 | 1349 |
| 207 | 1362 |
| 208 | 1374 |
| 209 | 1387 |
| 210 | 1400 |
| 211 | 1413 |
| 212 | 1426 |
| 213 | 1439 |
| 214 | 1452 |
| 215 | 1465 |
| 216 | 1479 |
| 217 | 1492 |
| 218 | 1505 |
| 219 | 1519 |
| 220 | 1532 |
| 221 | 1545 |
| 222 | 1559 |
| 223 | 1573 |
| 224 | 1586 |
| 225 | 1600 |
| 226 | 1614 |
| 227 | 1628 |
| 228 | 1642 |
| 229 | 1656 |
| 230 | 1670 |
| 231 | 1684 |
| 232 | 1698 |
| 233 | 1712 |
| 234 | 1727 |
| 235 | 1741 |
| 236 | 1755 |
| 237 | 1770 |
| 238 | 1784 |
| 239 | 1799 |
| 240 | 1814 |
| 241 | 1828 |
| 242 | 1843 |
| 243 | 1858 |
| 244 | 1873 |
| 245 | 1888 |
| 246 | 1903 |
| 247 | 1918 |
| 248 | 1933 |
| 249 | 1948 |
| 250 | 1963 |
| 251 | 1979 |
| 252 | 1994 |
| 253 | 2009 |
| 254 | 2025 |
| 255 | 2033 |

Then, the resultant radiance factor (I/F) values is obtained by multiplying the decompanded numbers with the corresponding Radiance Scaling Factor (RSF) values, which are used to linearly map the 16-bit values to a radiance factor (I/F) value that should be between 0 and 1. These values are found in the label (LBL) file of each image. For estimating the image registration parameters, the left and right camera RGB images are used. After transforming them to radiance factor (I/F) values, a RGB to gray transformation is applied. Then, the two-step registration approach is applied to align these two RGB images, and the registration parameters for each step are obtained. All other stereo band images are then aligned using the registration parameters and a multispectral image cube is formed. Then, a robust anomaly detection algorithm is applied to locate interesting targets in the scene. Moreover, composition estimation algorithm is applied to determine the composition of each anomaly. With the provided set of anomaly detection and composition estimation tools, interesting locations are selected which can be used to guide the UGV to these locations.

The multiple imagers can be optical cameras or hyperspectral imagers.

Figure 2:
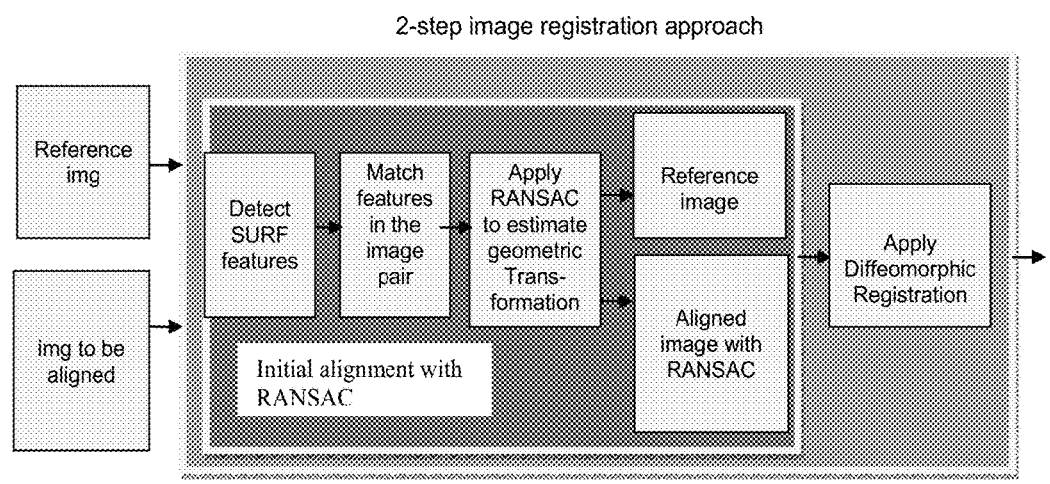
FIG. 2 shows the two-step image registration approach.

Accurate image registration is important in aligning the two multispectral images. After image registration/alignment, anomaly detection can then be performed. FIG. 2 shows the block diagram of the two-step image registration approach. Given two images, the first step corresponds to initialization with random sample consensus (RANSAC). In this first step, Speeded Up Robust Features (SURF) are detected in both images; these features are then matched; followed by applying RANSAC to estimate the geometric transformation. Assuming one image is the reference image; the other image content is then projected to a new image that is aligned with the reference image using the estimated geometric transformation with RANSAC. The second step uses the RANSAC-aligned image and the reference image and applies diffeomorphic registration, as described below.

The diffeomorphic registration algorithm solves the following problem: Given two images S and T, defined over $\Omega \subset R^2$, find the function pair $(m(\xi) \, g(\xi))$, $\xi \in \Omega$ that optimizes a similarity measure $E_{Sim}(S,T,\phi_{m,g})$ between S and T subject to the constraints:

$$\int_\Omega m = |\Omega| \quad (1a)$$

$$th_{high} > m(\xi) > th_{low}, \xi \in \Omega' \subset \Omega \quad (1b)$$

where $th_{low} > 0$ ensures that $\phi_{m,g}$ is a diffeomorphism. Here, $\Omega$ denotes the image domain, $m(\xi)$ corresponds to transformation Jacobian and $g(\xi)$ corresponds to curl where $\xi \in \Omega$. The transformation is parametrized by $m(\xi)$ and $g(\xi)$ and is denoted by $\phi_{m,g}$. $E_{Sim}$ corresponds to a similarity measure which in this case SSD (Sum of Squared Differences) is used.

It should be noted that when $th_{low} \approx th_{high}$ inequality constraint (1b) effectively imposes the incompressibility constraint in a subregion $\Omega$ of the image domain $\Omega$.

Given an image pair S (study) and T (template), and $th_{low}$ and $th_{high}$, the diffeomorphic registration algorithm consists of the following implementation steps: Step 1. Compute unconstrained gradients, $\nabla_m E_{Sim}(S,T,\phi_{m^i,g^i})$ and $\nabla_g E_{Sim}(S,T,\phi_{m^i,g^i})$ Step 2.

a. Terminate if step size $\delta < \delta_{th}$, or the maximum iteration is reached.

b. Update (m,g) by $$m^{i+1} = m^i + \delta \cdot \frac{\nabla_m E_{Sim}}{\max|\nabla_m E_{Sim}|} \text{ and}$$

$$g^{i+1} = g^i + \delta \cdot \frac{\nabla_g E_{Sim}}{\max|\nabla_g E_{Sim}|}$$

Step 3.

a. For each pixel location $\xi \in \Omega' \subset \Omega$ impose constraint (1b) by $m^{i+1}(\xi) \leftarrow \max(m^{i+1}(\xi) th_{low})$ and $m^{i+1}(\xi) \leftarrow \min(m^{i+1}(\xi), th_{high})$.

b. For each pixel location $\xi \in \Omega$ impose constraint (1a) by $$m^{i+1}(\xi) \leftarrow m^{i+1}(\xi) \cdot \frac{|\Omega|}{\sum_{\xi \in \Omega} m^{i+1}(\xi)}$$

Step 4.

Compute $\phi_{m^{i+1}, g^{i+1}}$ and update $E_{Sim}$. If it improves, $i \leftarrow i+1$, go to Step 1, otherwise, decrease $\delta$ and go to Step 2.

The alignment method can be applied to more than two images through serial or parallel application of the method involving subsequent alignment of an aligned image with a third image. Further, it can be applied to the output of multiple video images to create a series of aligned images along a time dimension. The time points can then be optionally aligned and fused into a mosaicked image for visualization.

The present invention further utilizes a novel algorithm called CKRX based on Kernel RX, which is a generalization of the Reed-Xiaoli (RX) algorithm. For instance, when the kernel distance function is defined as the dot product of the two vectors, Kernel RX is the same as RX. Its advantage lies in its flexibility over RX; however, it is significantly slower than RX. CKRX is a generalization of Kernel RX, i.e. CKRX is reduced to Kernel RX under some particular settings.

The basic idea in creating a CKRX is to first determine the clusters of the background points. Then, replace each point in the cluster with its cluster's center. After replacement, the number of unique points is the number of clusters, which can be very small comparing to the original point set. Although the total number of points does not change, the computation of the anomaly value can be simplified using only the unique cluster centers, which improves the speed by several orders of magnitude.

The present invention proposes to apply Deep Neural Network (DNN) techniques to further improve the chemical element classification and composition estimation performance in targets or anomalies. Two of the DNN techniques adapt to the element classification and chemical composition estimation problem are the Deep Belief Network (DBN) and Convolutional Neural Network (CNN). DNN techniques have the following advantages:

Better capture of hierarchical feature representations
Ability to learn more complex behaviors
Better performance than conventional methods
Use distributed representations to learn the interactions of many different factors on different levels
Can learn from unlabeled data such as using the RBM pretraining method
Performance can scale up with the number of hidden layers and hidden nodes on fast GPUs The present invention also allows operators to interact with target detection results via a user friendly graphical user interface.

Example 1

This is a demonstration of subpixel level registration errors with the two-step registration approach using actual Mars MASTCAM images (SOLDAY 188).

As shown in FIGS. 3a)-3d), using one of the MASTCAM stereo image pair (RGB images) to demonstrate the effectiveness of the two-step image registration approach. Referring to FIG. 3a), this stereo image is a partial image from the SOLDAY 188 data. It shows the left MASTCAM image which will be used as the reference image. FIG. 3b) shows the right MASTCAM image which is going to be aligned to the left camera image. FIG. 3c) shows the aligned image after the first step with RANSAC. FIG. 3d) shows final aligned image after the second step with diffeomorphic registration.

Figure 4A:
FIGS. 4*a*) and 4*b*) show error difference images with the two-step registration process.
Figure 4B:
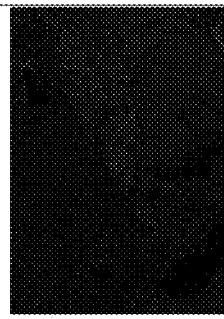

In order to show the effectiveness of the registration approach, first, the difference image between the aligned image and the left camera image in each of the two steps of the two-step registration approach is used. The difference images can be seen in FIGS. 4a) and 4b), respectively. It is realized that the registration errors can be easily noticed in the first step of registration with RANSAC whereas after the second step with diffeomorphic registration. The errors in the difference image can be hardly noticed.

In order to assess the performance of the two-step registration accuracy, a "pixel-distance" type measure is designed. In this measure, first, the SURF features in the reference and the aligned images in each step are found; then, the matching SURF features in the reference image and aligned image are found. The process is repeated for the pair of "reference image and RANSAC aligned image" and "reference image and final aligned image". Finally, the norm values for each matching SURF feature pair are found. The average of the norm values is considered as a quantitative indicator that provides information about the registration performance.

FIGS. 5a) and 5b) show the matching features in each step of the two-step registration approach. FIG. 5c) shows the resultant pixel distances in the matched SURF features in each step of the two-step registration approach. It can be clearly noticed that the second step of the two-step registration process reduces the registration errors to subpixel levels.

Example 2

A partial image section from one of the Middlebury stereo pair images, as described in the article mentioned above, "Representation Learning: A Review and New Perspectives," by Yoshua Bengio, Aaron Courville, and Pascal Vincent, IEEE Transactions on Pattern Analysis and Machine Intelligence, 2013, to examine the alignment improvement and assess its impact on the anomaly detection in each step of the two-step registration approach is used.

FIG. 6a) shows the partial image from one of the cameras (left camera), and FIG. 6b) shows the right camera which is to be aligned to the reference image. FIG. 6c) shows the initial alignment with RANSAC which is the aligned image after the first step of the two-step image registration approach. FIG. 6d) shows the final aligned image with the diffeomorphic registration, which is the second step. Because it is hard to assess the alignment accuracy, the same pixel distance based measure to examine the registration errors is applied.

Figure 7:
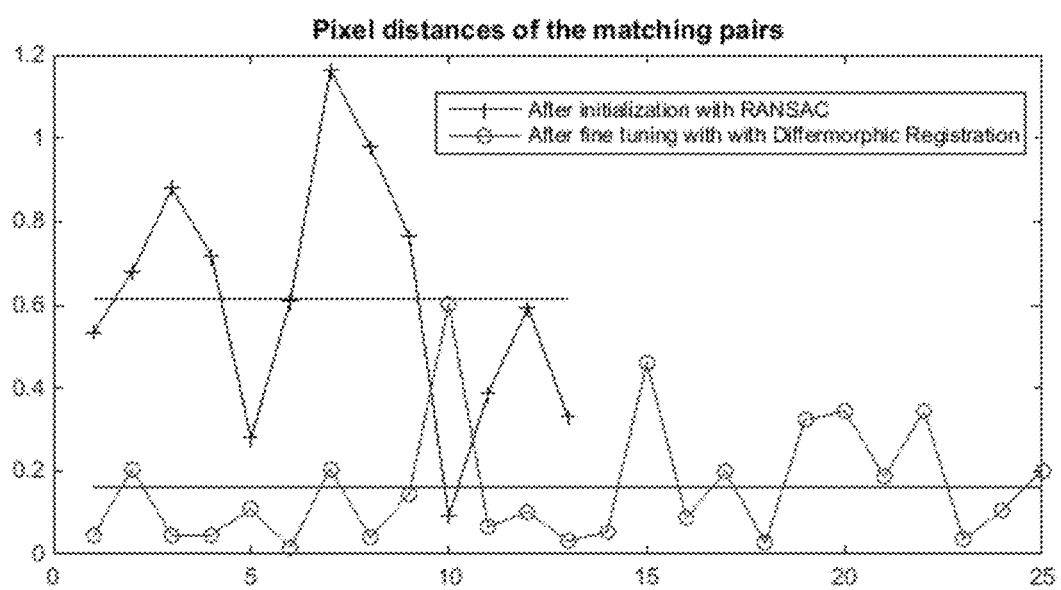
FIG. 7 shows computed pixel distances in the two-step registration process showing the second step reduces the registration errors to smaller subpixel levels.

FIG. 7 shows the computed pixel distances in each step of the two-step registration approach. It can be noticed that the second step of the two-step registration approach further reduces the registration errors.

In FIGS. 8a)-8c), an example that precise registration has a considerable impact on the anomaly detection results yielding more accurate anomaly detections is shown. Again, a section from the Middlebury image used earlier is utilized.

A section from this image where there are a few pixels that are quite different from the background pixels is selected. The selected image section that is used in the anomaly detection can be seen in FIG. 8a). It is the back left foot of the toy-alligator. The selected image section that will be used in the anomaly detection is shown in FIG. 8b). The pixels that correspond to the foot in the reference camera image are manually extracted. These pixels are considered the anomaly.

FIG. 8c) shows the manually extracted ground truth map. In order to see the impact of the registration performance on the anomaly detection, the reference camera RGB image and the aligned images in each step of the two-step registration process separately are stacked into a 6-band multispectral image cube. That is by stacking the reference camera RGB image and the RANSAC-aligned image of the first step to obtain one multispectral image cube. By stacking the reference camera RGB image and the diffeomorphic aligned image of the second step, another multispectral image cube is obtained. Then, a RXD anomaly detection technique to both these multispectral image cubes separately is applied. Following the generation of anomaly score images, the extracted ground truth map to get the ROC curves to compare the detection performances in each of the two steps is used.

Figure 9:
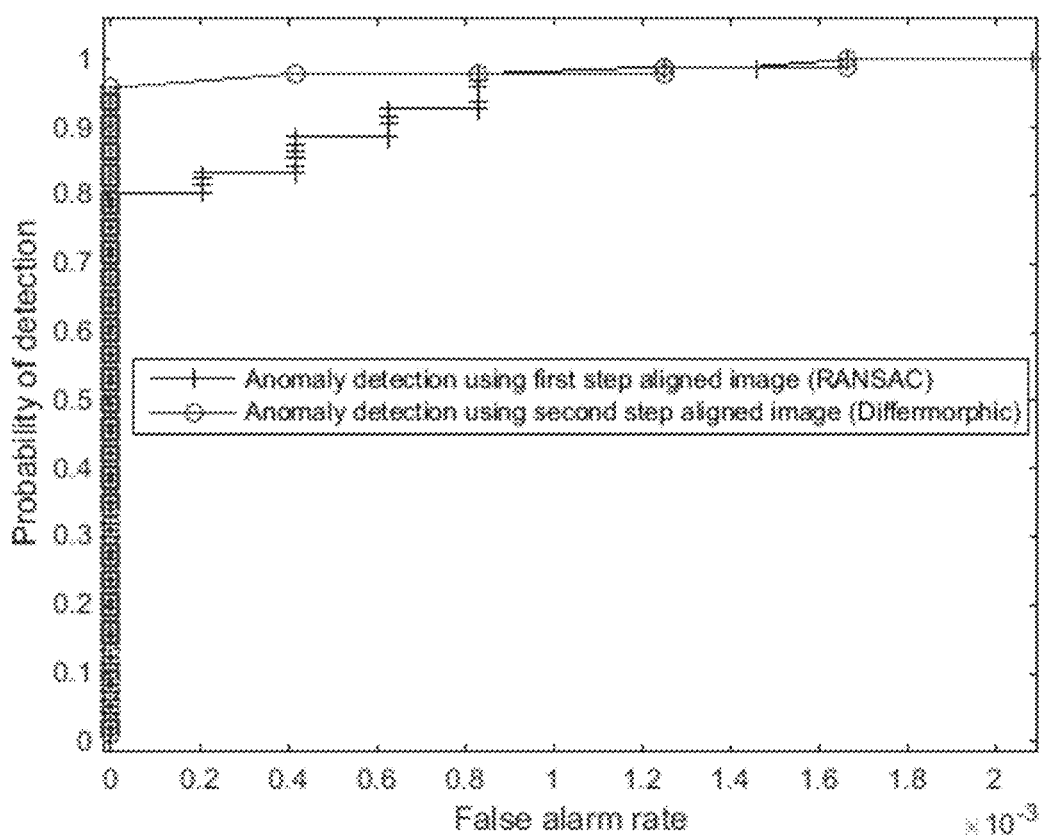
FIG. 9 shows resultant ROC curves for each step of the alignment in the two-step registration process.
Figure 10:
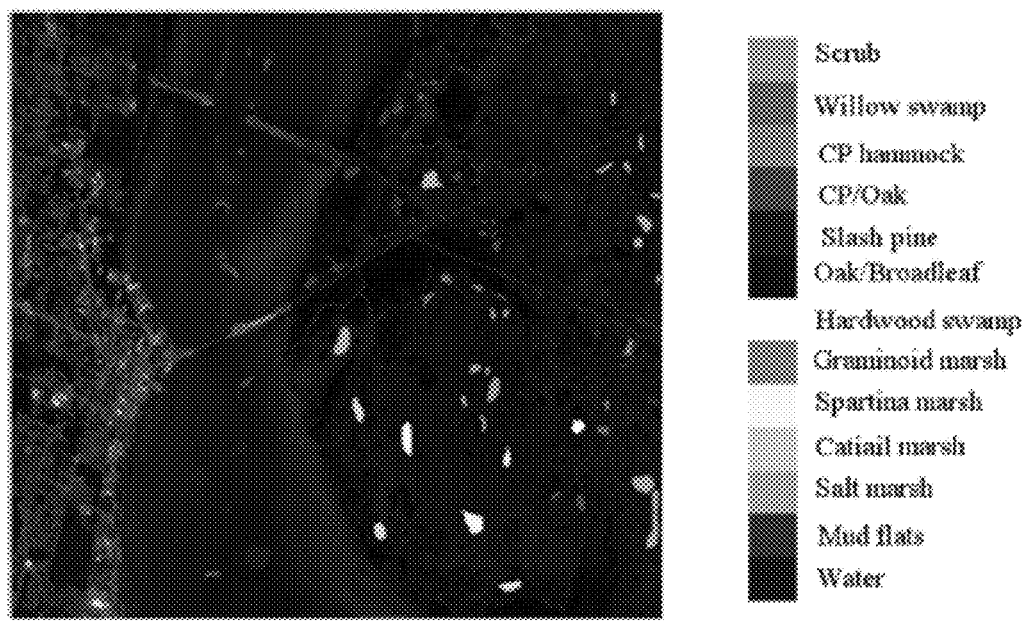
FIG. 10 shows NASA-KSC image and tagged pixels with ground truth information.

The resultant ROC curves can be seen in FIG. 9. From the ROC curves, it can be noticed that anomaly detection performance considerably improves with the second step of the two-step registration process which justifies our anticipation that improving the alignment of the stereo images with the proposed two-step image registration approach will have significant impacts on the anomaly detection or any analysis that involves the constructed multispectral image cube from the stereo images.

In the present invention, neural networks are used for target classification.

Figure 8:
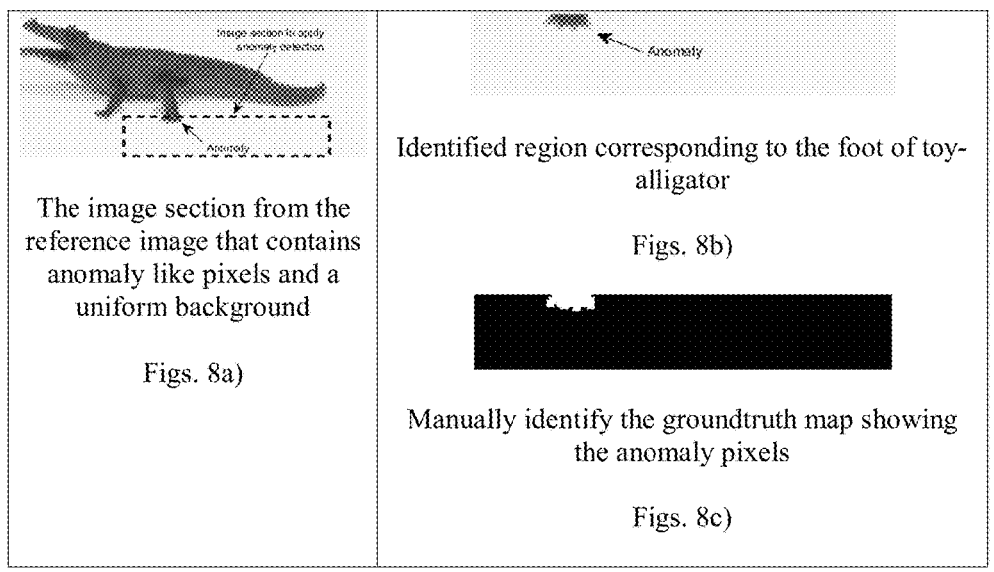
FIGS. 8*a*)-8*c*) show the impact of precise registration on anomaly detection performance.

In a preliminary investigation, one of the DNN techniques known as Deep Belief Network (DBN) is applied for target classification in hyperspectral data. The hyperspectral image used in this example is called "NASA-KSC" image. The image corresponds to the mixed vegetation site over the Kennedy Space Center (KSC) in Florida. The image data was acquired by the National Aeronautics and Space Administration (NASA) Airborne Visible/Infrared Imaging Spectrometer instrument, on Mar. 23, 1996, as described in the article "Deep Learning-Based Classification of Hyperspectral Data," Y. Chen, et. al., *IEEE Journal of Selected Topics in Applied Earth Observations and Remote Sensing*, Vol. 7, No. 6, June 2014. AVIRIS acquires data in a range of 224 bands with wavelengths ranging from 0.4 μm to 2.5 μm. The KSC data has a spatial resolution of 18 m. After excluding water absorption and low signal-to noise ratio (SNR) bands, there are 176 spectral bands for classification. In the NASA-KSC image, there are 13 different land-cover classes available. It should be noted that only a small portion of the image has been tagged with the ground truth information and these pixels with the tagged ground truth information have been used in the classification study. The tagged pixels with ground truth information are shown in FIG. 8.

For the benchmark techniques, SVM (Support Vector Machine) and SAM (Spectral Angle Mapper) are applied. In SVM, LIBSVM toolbox is used with a kernel type of Radial Basis Function and automatically regularized support vector classification SVM method type (nu-SVC). In addition to using spectral information, local spatial information for each pixel (RGB bands of a local window of size 7×7) is extracted and transformed into a vector, then added to the end of the spectral information. The correct classification rates for the test data set are shown in Table 1 below. It can be seen that DBN and SVM results are very close to each other and both perform.

TABLE 1

Classification performance for NASA-KSC

| | Input data type | Test set (correct classification rate) |
|---|---|---|
| SAM | Spectral | 0.7847 |
| SVM | Spectral | 0.9340 |
| DBN | Spectral | 0.9389 |
| SVM | Spectral + Spatial | 0.9709 |
| DBN | Spectral + Spatial | 0.9631 |

As mentioned above, Kernel RX, is a generalization of the Reed-Xiaoli (RX) algorithm. When the kernel distance function is defined as the dot product of two vectors, kernel RX is the same as RX. Its advantage lies in its flexibility over RX. However, it is significantly slower than RX. The present invention therefore utilizes a novel cluster kernel RX (CKRX) algorithm, which can perform fast approximation of kernel RX. CKRX is a generalization of kernel RX, meaning CKRX is reduced to kernel RX under some particular settings. The CKRX algorithm is below:

Algorithm CKRX

Input: Background $x_b = [x_1, x_2, \ldots, x_M]$, a testing pixel r
Output: The anomaly value v
Algorithm:
1. Perform clustering on $X_b$ and get a set of clusters $C = \{(z_1,s_2),(z_2,s_2), \ldots ,(z_m,s_m)\}$ where $z_i$ and $s_i$ are center and size of $i^{th}$ cluster.
2. Set v = WKRX (C,r).

WKRX is the weighted KRX algorithm:

Algorithm WKRX
Input: Weighted points $C = \{(z_1, s_1), (z_2, s_2), \ldots , (z_m, s_m)\}$, a testing point r
Output: The anomaly value v
Algorithm:
1. Construct kernel matrix K, where $K_{ij} = k(z_i, z_j)$ and k is the kernel function. A commonly used kernel is the Gaussian radial basis function (RBF) kernel
$k(x, y) = \exp((-||x - y||^2)/c)$
2. Set $\hat{\mu}, = \mu = Kw$ where $w_i = s_i / \sum_{i=1}^{m} s_i$
3. Set $\hat{K} = K - \mu e^T - e\mu^T + ew^T \mu e^T$ where e is an m × 1 vector.
4. Perform eigen-decomposition. $\hat{K}SV = VD$ where S is a diagonal matrix with $S_{ii} = s_i$.
5. Cut D and V to a length of t. $\overline{D} = D(1:t, 1:t), \overline{V} = V(:, 1:t)$ where $D(t + 1, t + 1) < D(1, 1) \times 10^{-8}$
6. Set $\overline{\mu} = \mu - ew^T\mu$ -continued 7. Set $\bar{\gamma} = \gamma - ew^T\gamma$ where $\gamma_i = k(z_i, r)$
8. Set $v = ||\overline{D}^{-1}\overline{\nabla}^T(\bar{\gamma} - \bar{\mu})||_2$.

Figure 11A:
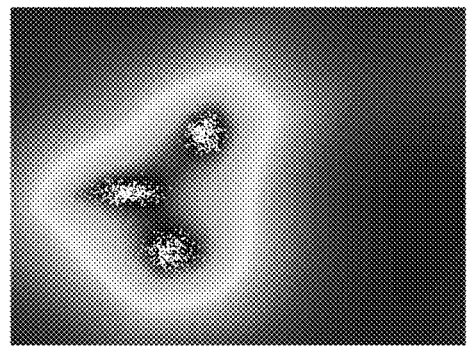
FIGS. 11*a*)-11*c*) show results of different algorithms.
Figure 11B:
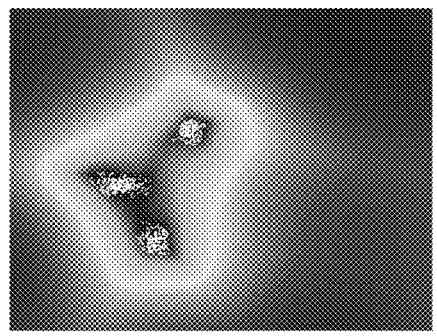
Figure 11C:
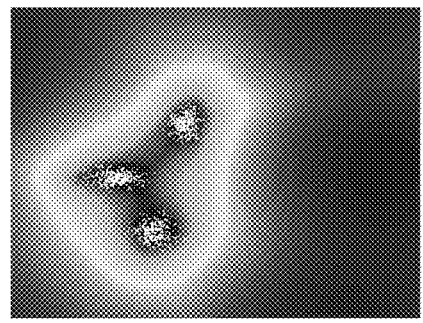

FIGS. 11a)-11c) show an example of CKRX applied to a synthetic data set. The data model is a mixture of Gaussian functions, and there are 1000 data points. The kernel is a Gaussian kernel. The color in the image corresponds to the log of the anomaly value. The results using KRX, KRX with sub-sampling, and CKRX are shown in FIGS. 11a), 11b) and 11c), respectively. The number of the original data points is 1000, and the data point number in both sub-sampled KRX and CKRX is 50. From the image, the CKRX provides better approximation than sub-sampled KRX is observed. Also, the speed of these three algorithms is compared, and the result is shown in Table 2 below. The eigen-decomposition of the kernel matrix in CKRX is about ½000 of that in original KRX, which is a huge speed improvement.

TABLE 2

Comparison of the speed of KRX, KRX with sub-sampling and CKRX

| Time (s) | Algorithm | | |
|---|---|---|---|
| | KRX (1000 points) | KRX (50 points) | CKRX (50 clusters) |
| Construct Kernel | 0.1590 | 0.0038 | 0.0030 |
| Eigen Decomposition | 4.6511 | 0.0018 | 0.0023 |
| Image Anomaly | 6.82 | 0.62 | 0.61 |

Figure 12A:
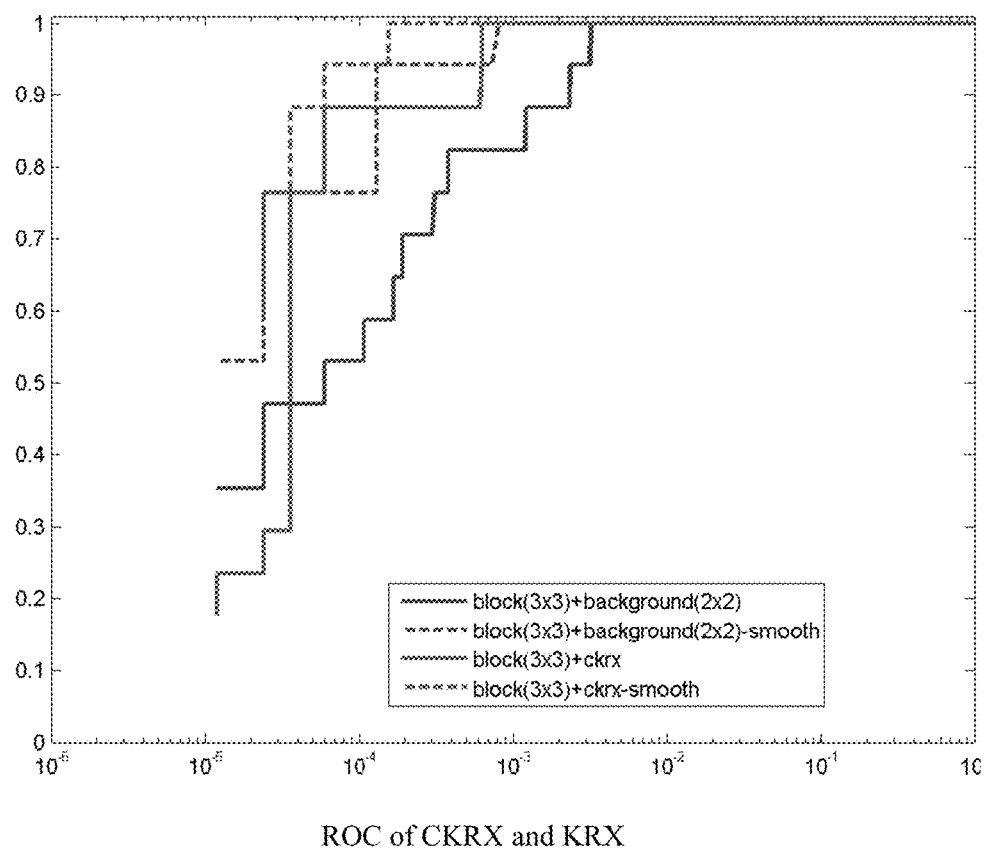
FIGS. 12*a*)-12*b*) show comparison of kernel RX with background subsampling (2×2) options and CKRX.
Figure 12B:
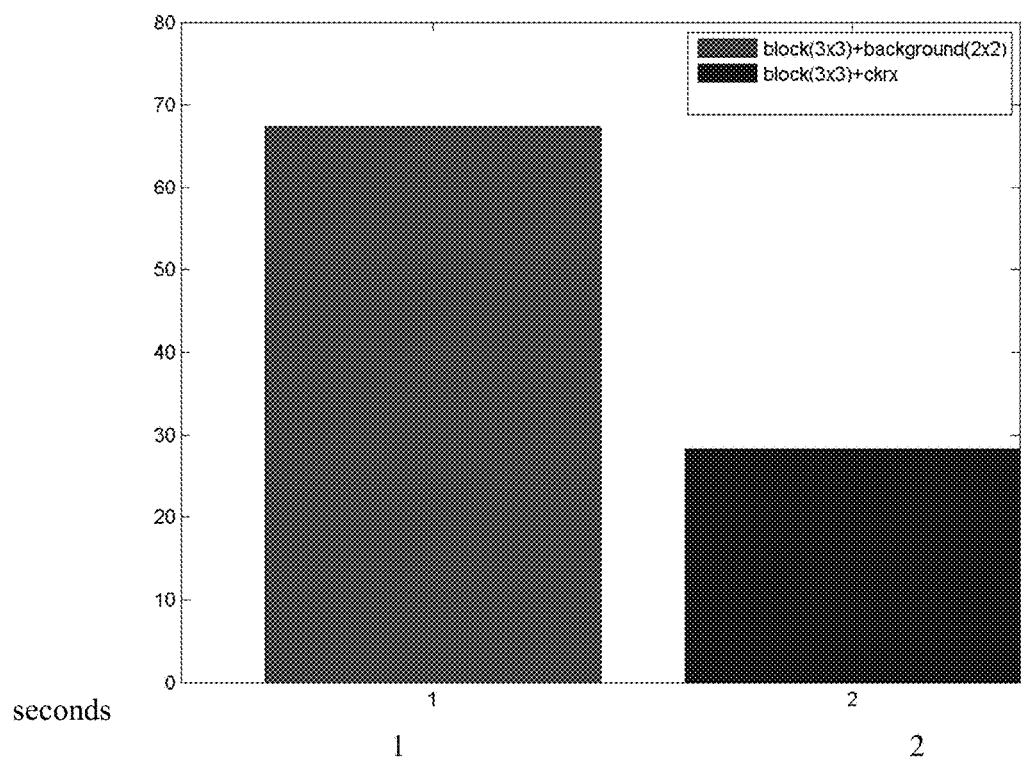

Another experiment was to use the Air Force hyperspectral image with PCA transformation and only 10 bands are kept. FIGS. 12a) and 12b) show the comparison of kernel RX with background sub-sampling (2×2), and CKRX. From FIG. 12b), we can see that CKRX performs better than kernel RX while the speed of CKRX is at least 2 times faster. The performance CKRX is better than KRX, but the speed improvement factor is more than 2 times. It should be noted that the CKRX of the present invention can be implemented in multi-core PCs. If a QuadCore PC is used, 4 times of the speed can be further improved, which is about 6 seconds, quite close to real-time.

What is claimed is:

1. A method of aligning multiple images of a scene:
receiving a reference image and an image-to-be-aligned, wherein said reference image is a frame of a first video imager at a first time point, said image-to-be-aligned is a frame of a second video imager at said first time point, and said finely-aligned image is a first aligned video frame;
transforming said reference image into a transformed reference image comprising radiance factor grayscale pixel data;
transforming said image-to-be-aligned into a transformed image-to-be-aligned comprising radiance factor grayscale pixel data;
aligning said transformed reference image and said transformed image-to-be-aligned, comprising:
applying random sample consensus to said transformed reference image and said transformed image-to-be-aligned to estimate a geometric transformation to derive a coarsely-aligned image from said transformed image-to-be-aligned; and
applying diffeomorphic registration to derive a finely-aligned image from said coarsely-aligned image;
receiving said first aligned video frame and a second aligned video frame corresponding to a second time point;
transforming said first aligned video frame into a transformed first aligned video frame comprising radiance factor grayscale pixel data;
transforming said second aligned video frame into a transformed second aligned video frame comprising radiance factor grayscale pixel data; and
aligning said transformed first aligned video frame and said transformed second aligned video frame, comprising:
applying random sample consensus to said transformed first aligned video frame and said transformed second aligned video frame to estimate a geometric transformation to derive a second coarsely-aligned image from said transformed second aligned video frame; and
applying diffeomorphic registration to derive a mosaicked image from said second coarsely-aligned image.

2. The method of claim 1, wherein said reference image and an image-to-be-aligned are 8-bit RGB pixel data, and said transforming said reference image into a transformed reference image step comprises:
decompanding said 8-bit RGB pixel data to-decompanded numbers in a range of greater than 8 bits;
multiplying each of said decompanded numbers by corresponding radiance scaling factor values to derive radiance factor values.

3. The method of claim 2, wherein said reference image into a transformed reference image step further comprises:
transforming said radiance factor values from RGB to grayscale.

4. The method of claim 1, further comprising:
applying an anomaly detection algorithm to said finely-aligned image.

5. The method of claim 4, wherein said anomaly detection algorithm is a cluster kernel Reed-Xiaoli algorithm.

6. The method of claim 1, further comprising:
applying a composition estimation algorithm to said finely-aligned image.

7. The method of claim 6, wherein composition estimation algorithm is a deep neural network algorithm.

8. The method of claim 4, further comprising:
applying a composition estimation algorithm to said finely-aligned image.

9. The method of claim 8, wherein composition estimation algorithm is a deep neural network algorithm.

10. The method of claim 1, wherein said applying random sample consensus step comprises:
detecting speeded up robust features in said transformed reference image and said transformed image-to-be-aligned;
matching said detecting speeded up robust features in said transformed reference image and said transformed image-to-be-aligned to derive a set of matched features;
applying random sample consensus to said set of matched features to derive a geometric transformation; and applying said geometric transformation to said transformed image-to-be-aligned to derive said coarsely-aligned image.

11. The method of claim 1, further comprising:

receiving a third image of said scene;

transforming said third image into a transformed third image comprising radiance factor grayscale pixel data;

aligning said transformed third image and said finely-aligned image, comprising:

applying random sample consensus to said third image and said finely-aligned image to estimate a geometric transformation to derive a second coarsely-aligned image from said transformed third image; and applying diffeomorphic registration to derive a second finely-aligned image from said second coarsely-aligned image.

* * * * *